United States Patent [19]

Aasted

[11] 3,735,857
[45] May 29, 1973

[54] MECHANISM FOR DELIVERING GOODS FROM CONTINUOUSLY OPERATING CHOCOLATE MOULDING PLANTS

[76] Inventor: Kai Christian Sophus Aasted, Skovgardsvej 41, Charlottenlund, Denmark

[22] Filed: Jan. 26, 1971

[21] Appl. No.: 109,912

[30] Foreign Application Priority Data

Jan. 30, 1970 Denmark..............................453/70

[52] U.S. Cl.................................................198/155
[51] Int. Cl...............................................B65g 17/00
[58] Field of Search......................198/155, 147, 158; 104/130, 131

[56] References Cited

UNITED STATES PATENTS

| | | |
|---|---|---|
| 1,428,721 | 9/1922 | Towne..............................198/147 X |
| 2,936,875 | 5/1960 | von Kritter..........................198/155 |
| 1,465,312 | 8/1923 | Oyen...................................104/131 |

*Primary Examiner*—Harvey C. Hornsby
*Assistant Examiner*—Douglas D. Watts
*Attorney*—Waters, Roditi, Schwartz & Nissen

[57] ABSTRACT

Moulded chocolate slabs are transported on conveyor plates mounted in pivots on to parallel conveyor chains having equal and even speed. At the known mechanisms each plate has at its rear end a guide pin which follows a horizontal fixed track in order to keep the plate horizontal during the transport. At the station of delivery the track slopes downwards to tilt the plate. By attaching the guide pin at the leading end of the plate and let the track slope upwards a quicker tilting movement and a better safety against locking of the pin in the track — even at a considerable sloping angle — can be obtained. The front end of the sloping track portion consists of two simultaneously tilted track sections.

2 Claims, 3 Drawing Figures

MECHANISM FOR DELIVERING GOODS FROM CONTINUOUSLY OPERATING CHOCOLATE MOULDING PLANTS

The invention relates to a mechanism of the kind used for delivering goods from continuously operating chocolate moulding plants in which moulded slabs of chocolate after being deposited on conveyor plates advanced at uniform speed through the plant by two parallel driving chains are discharged to one or more transversely running conveyor bands by which the slabs are conveyed to packing machines. The said conveyor plates have pivots disposed near the vertical transverse plane of the horizontal plate by means of which pivots the plates are pivotally suspended in the chains, whereby the plates, owing to re-adjustment of a movable part of a fixed track controlling a guide pin provided on the plate, with their trailing end tilt from a horizontal position down towards the transversely running band when passing same, by which the slabs slide from the plate down onto the transversely running band.

Such a mechanism is known from German patent specification No. 1,146,432. However, the tilting movement of the conveyor plate of the said disclosed mechanism is not sufficiently great to ensure discharge of the chocolate slabs to the transverse conveyor band, and the mechanism has therefore a scraper that directs the slab down onto the conveyor band.

With certain mechanisms known from the British patent specification No. 1,019,496 and the German specifications No. 1,246,544 and No. 1,263,589 as published the conveyor plate performs a tilting movement that is sufficient to cause the slab of chocolate to slide by itself down upon the transversely running conveyor band. At its trailing end the said plate has a guide pin which, when tilting is to take place, moves into a separate track which it leaves again after completion of the tilting.

According to the invention the track portion that causes the tilting is located above the other, substantially horizontal track portions, and the guide pin of the individual conveyor plate is located at the leading end of the plate. It is advantageous to have the tilting track located above the horizontal track portions because it is difficult to provide room for the tilting track beneath these owing to the proximity of the transversely running conveyor band, and, in addition, this location of the tilting track also permits the said track to join the horizontal track portions again without requiring the provision of any movable track portion at the junction. The provision of the guide pin at the leading end of the conveyor plate is so far a consequence of the location of the tilting track portion, but when the plate is tilted it is an advantage in itself that the pin is disposed at the leading edge since it is then pushed into the turning movement of the tilting track instead of being drawn into the said track as is the case when the guide pin is disposed at the trailing edge of the plate. In the latter case the main risk is that there will be excessive friction with the track portion, and the said portion cannot therefore be provided with such a great slope as the track portion according to the invention. With the last-mentioned track portion it is therefore possible to obtain the quicker turning movement of the conveyor plate and consequently the quickest operation of the mechanism.

The front part of the upper track portion may according to the invention consist of two movable track portions, of which the upper one is pivotable about an axis located above the fixed track portions and staggered in a direction opposite to the direction of movement in relation to the pivotal axis of the lower track portion. As a result, the identical distance between the two movable track portions may be maintained irrespective of their position.

Further, the movable track portions may according to the invention be coupled together by means of a connecting rod which ensures synchronous turning of them. As a result, the distance between the two track portions will be maintained constant, thus ensuring a compulsory guiding of the guide pin also during the initial stage of the tilting movement.

The drawing shows an embodiment of the mechanism according to the invention.

Figure 1:
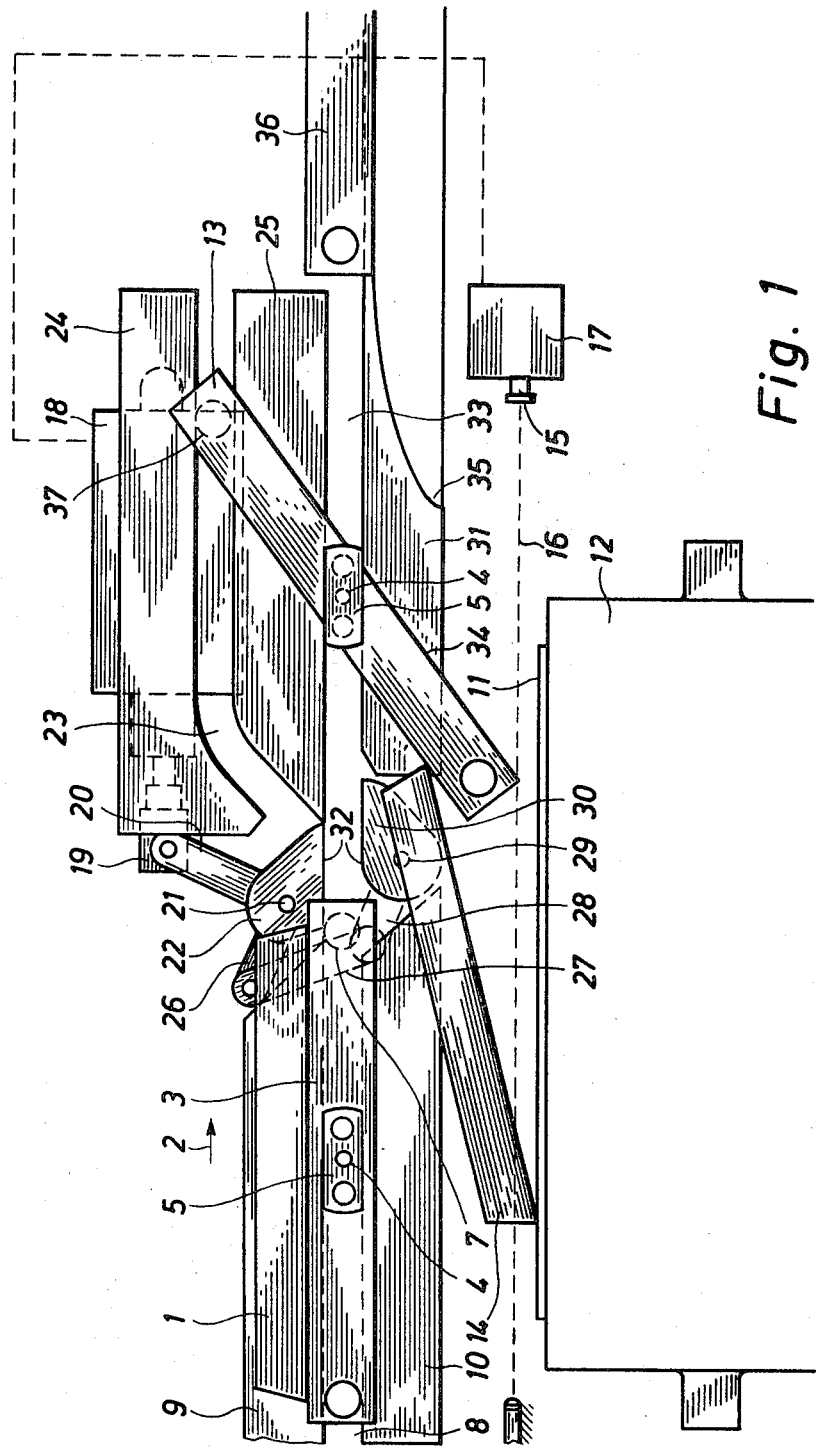
FIGS. 1 and 2 are sideviews of the mechanism in two different positions.

In the drawing, 1 is a slab of chocolate lying on a conveyor plate 3 and passing in the direction of an arrow 2 through a chocolate moulding plant, of which only such parts as are necessary for understanding the invention are shown in the drawing. The plate 3 is supported by a pair of coaxial pins 4, each introduced into a link 5 of a pair of side chains 6 which are moved parallelly to each other through the plant at identical speed. During the movement the plate 3 is kept in horizontal position by a control pin 7 provided on the plate and engaging a track portion 8 between two fixed rails 9 and 10 of the plant.

Beneath the latter is provided a transversely running conveyor band 11, driven by a pair of rollers 12. As the plate 3 passes the said band 11, the plate is turned into the inclined position indicated by 13, by which the slab 14 of chocolate slides down upon the band 11. If, however, the said band cannot receive the slab 14, the plate 3 has not to be swung out from its horizontal position, and the mechanism tilting the plate 3 is therefore adapted so as only to lead the guide pin 7 into a side track when an electronic control mechanism, which, for example, may contain a light-sensitive cell 15 activated by a beam of light 16 directed through the space directly above the band 11, has ascertained that the band parts that are about passing beneath the rail 10 are free. In that case a relay 17 activates a hydraulic cylinder 18 the piston rod 19 of which is moved from the position indicated in FIG. 1 to the position indicated in FIG. 2. The piston will thereby turn an arm 20 provided on a fixed shaft 21, by which a track portion 22 gives access for a track portion 23 between two fixed parts 24 and 25.

Simultaneously, an arm 26 provided on the shaft 21 is caused to swing and by means of a connecting rod 27 the said arm swings an arm 28 provided on a fixed shaft 29 on which is mounted another track portion 30 which thereby cuts off the access to a horizontal track portion 33 between the part 25 and another fixed part 31. The track portions 22 and 30 have flat guiding surfaces 32 which are parallel in both their end positions (see FIGS. 1 and 2).

Figure 2:
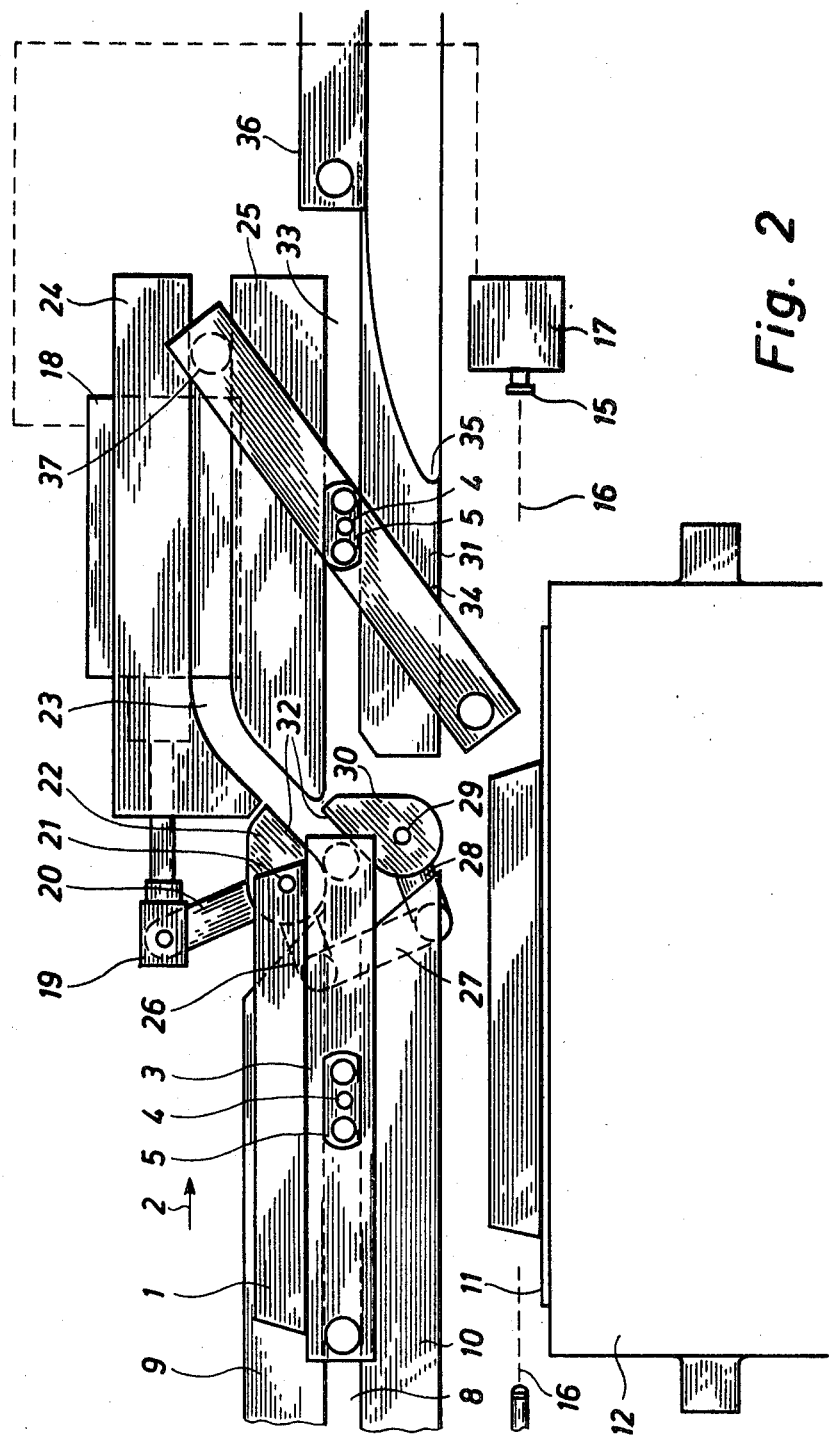

Directly after the pin 7 having passed the guiding surfaces 32, the piston rod 19 passes the said movable parts back to the position indicated in FIG. 1 so that the pin 4 may pass freely into the track portion 33 between the fixed parts 25 and 31.

When the slab 14 has been delivered to the band 11, the plate 13 is to swing back into horizontal position. The guide pin 37 of the plate then leaves the track portion 23 and the lower part 34 of the plate is engaged by a fixed stop 35 along which the plate during the continued horizontal movement of the guide pins 4 will be swung up into horizontal position 36 again.

Figure 3:
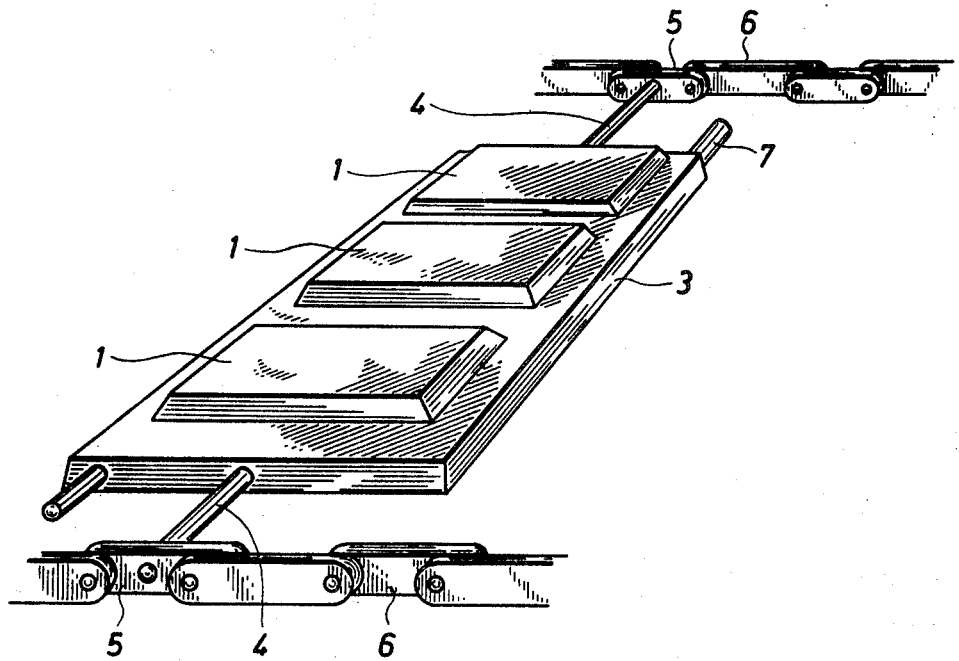
FIG. 3 is a perspective view of a part of a conveyor plate.

FIG. 3 shows the plate 3 carrying three chocolate slabs 1. However, it may be adapted to carry additional slabs which may be arranged in several rows or in extended order.

I claim:

1. A mechanism for delivering goods, such as chocolate slabs or the like, from a continuously operating chocolate molding plant to packing machines, comprising a first conveyor and one or more transversely moving conveyor bands for receiving said slabs from said first conveyor being positioned therebelow, said first conveyor including a pair of parallel spaced conveyor driving chains advancing at uniform speed through said plant, a plurality of horizontally disposed conveyor plates being supported by said chains and having said molded chocolate slabs positioned thereon, pivot means on said plates disposed proximate to the vertical transverse plane of each of said plates, said pivot means pivotally journalling said plates between said chains, a guide pin mounted on each of said plates adjacent the leading edge thereof, a fixed substantially horizontal track controlling movement of said guide pins, said track having an adjustably movable portion, switch means providing for movement of said movable track portion, said movable track in one position thereof contacting the guide pin of a respective one of said plates so as to tilt the trailing edge of said plate downward toward said transversely moving conveyor band and having the slab on said plate slide onto said conveyor band, said track comprising upper and lower parallel spaced stationary track portions forming a guide path therebetween for each of said guide pins, the forward end of said upper track portion having a movable track portion, and the forward end of said lower track portion having a movable track portion, shaft means pivotably mounting said upper movable track portion above the guide path formed by the fixed track portions, and means pivotably mounting said lower movable track portion below the guide path formed by the fixed track portions, said upper movable track portion being staggered in a direction opposite to the direction of movement of said plates relative to the pivotal axis of said lower movable track portions.

2. A mechanism as claimed in claim 1, comprising connecting rod means operably interconnecting said upper and lower movable track portions so as to provide synchronous pivotal movement of said track portions.

* * * * *